UNITED STATES PATENT OFFICE.

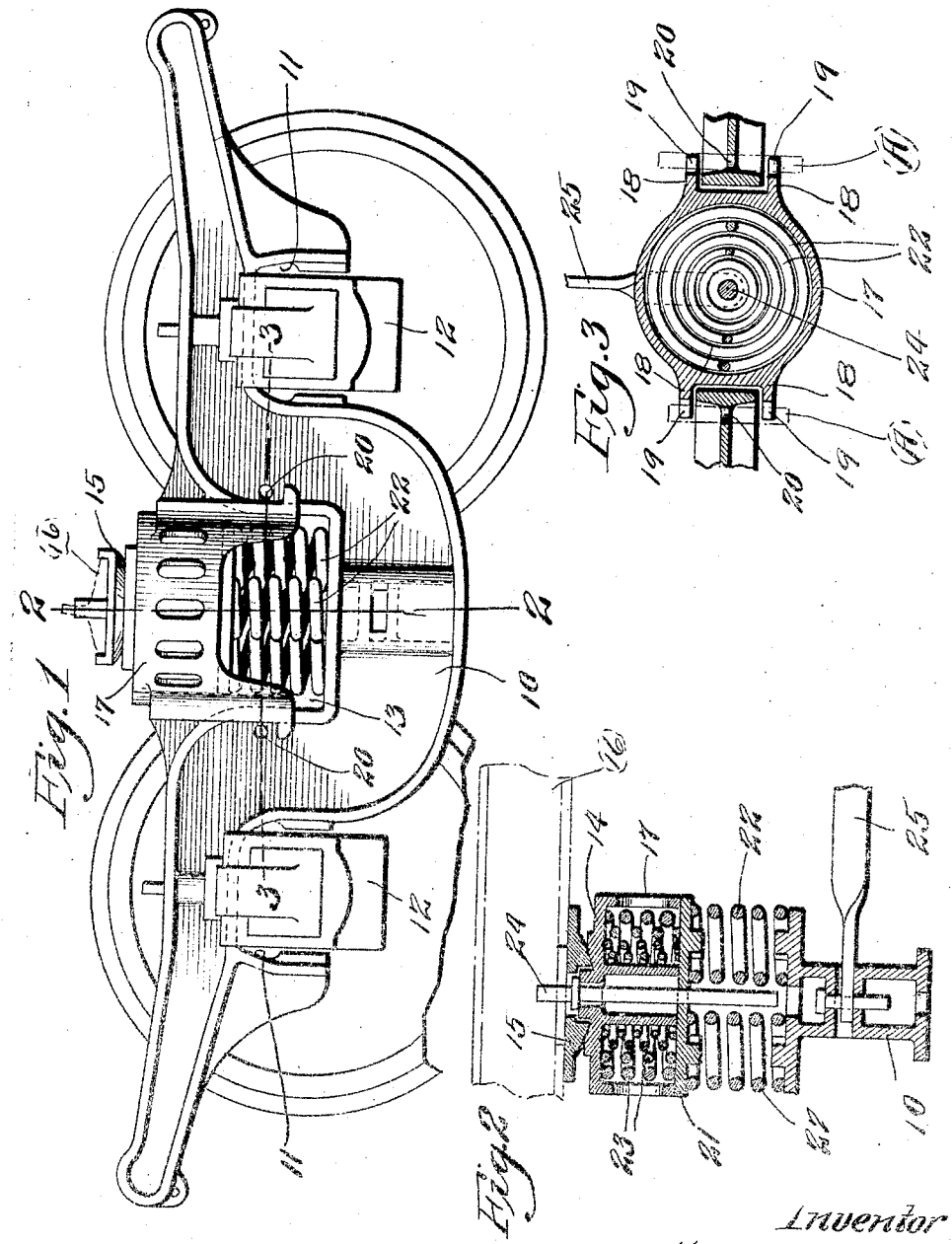

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,358,016.     Specification of Letters Patent.     Patented Nov. 9, 1920.

Application filed August 11, 1919. Serial No. 316,627.

*To all whom it may concern:*

Be it known that I, HARRY M. PFLAGER, a citizen of the United States, residing at city of St. Louis, State of Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

This invention relates to new and useful improvements in car truck construction and particularly to the type of car truck disclosed in Reissue Letters Patent No. 14,221 dated November 28th, 1916, the original of which, Letters Patent No. 1,147,430 was granted to me on July 20th, 1915.

In the construction disclosed in said original and reissue Letters Patent, the weight of the car body, including the load carried thereby, is supported at the four corners of the car and my present invention has for its principal object, the provision of means including springs for distributing the weight of the car and the load thereof onto the journals when unusual track conditions exist.

This distributing means includes a spring or springs auxiliary to the main carrying springs, such auxiliary springs being capable of greater deflection and greater recoil travel than the main load carrying springs so as to in no wise affect the height of the draw bar relative to the track rails.

Further objects of my invention are to arrange the compensating spring or springs between the bottom center plate and the load carrying springs; to provide means whereby the center plate is guided in its vertical movement directly by parts of the truck frame; and further to provide simple means whereby the bottom center plate may be locked to the side frame of the truck when removing the truck from the car for repairs, thus preventing the compensating springs from acting to force the bottom center plate out of its normal operative position on the side frame.

With the foregoing and other objects in view, my invention consists in certain novel features of construction and arrangement of parts hereinafter more fully described and claimed, and illustrated in the accompanying drawings, in which:

Figure 1 is a side elevational view of a car truck of my improved construction.

Fig. 2 is a vertical section taken approximately on the line 2—2 of Fig. 1.

Fig. 3 is a horizontal section taken approximately on the line 3—3 of Fig. 1.

Referring by numerals to the accompanying drawings which illustrate a practical embodiment of my invention, 10 designates one of the side frames or wheel pieces of the truck, said side frame being preferably cast in a single piece and provided in its underside with openings 11 for the accommodation of the usual journal boxes 12; that portion of the side frame between the journal box openings is made substantially U-shaped in order to form an opening or space 13 for the accommodation of the load carrying springs, the bottom center plate casting and the auxiliary springs.

The bottom center plate casting comprises a plate 14, the top of which is provided with a seat which receives the top center plate 15 and the latter serving as a support for the transversely disposed body bolster 16.

Formed integral with the bottom center plate 14 and depending from the edge thereof is an annular wall 17 and formed integral with this wall at diametrically opposite points thereon are vertically disposed pairs of ribs 18 which, when the bottom center plate is properly positioned in the opening 13, coöperate with parts of the side frame 10 to the sides of the opening 13, thereby serving to guide the bottom center plate during its vertical movement.

The lower portions of these guide ribs 18 are extended outwardly to form stop lugs 19 and formed through the web of the side frame slightly above the points normally occupied by these lugs 19 are transverse apertures 20. Positioned against the underside of the annular wall 17 on the bottom spring plate 14 is a plate 21 and interposed between this plate and the top of the side frame 10 immediately below the opening 13 are load carrying springs 22.

Arranged within the housing formed by the annular wall 17 and disposed between the bottom center plate 14 and the plate 21 are auxiliary springs 23 which are normally under compression and which are relatively lighter, and of less tension than the main springs 22. The upper center plate 15, the lower center plate 14, and the plate 21 are tied to each other by a vertically disposed pin 24 and the two side frames of the truck are connected to each other by means of the usual transverse tie bar 25.

It will be understood that under normal conditions the main springs 22 carry the weight of the car body and its load and that during service the side frame and bottom center plate 17 are free to move vertically with respect to each other during which movement the bottom center plate is guided by the vertically disposed pairs of ribs 18 cooperating with adjacent parts of the side frame.

In the event that the truck wheels pass into a depression in the track rails and the side frame drops to such a degree as to exhaust the main springs or permit the same to expand to their limit, then the auxiliary springs, which are normally bottled up and under compression, will act and force the side frame 10 downward so as to maintain the wheels associated with said frame in contact with the depressed portion of the track rail. By arranging the compensating springs between the bottom center plate and the load carrying springs, a very compact and effective arrangement is produced for said compensating springs are disposed where they can exert downward pressure directly on top of the load carrying springs when the latter are expanded to their limit and thus the power of said auxiliary springs is transmitted directly onto the central portion of the side frame.

Under ordinary conditions, when removing the truck from the car for repairs the compensating springs, when released, will force the bottom center plate entirely out of contact with the side frame, but in my construction this objectionable result is eliminated and the bottom center plate is locked to the side frame by the insertion of the pins or bars A, or the like, in apertures 20 and which pins or bars engage the lugs 19 thereby preventing the separation of the bottom center plate from the side frame due to the expansive action of the auxiliary springs.

It will be readily understood that minor changes in the size, form and construction of the various parts of my improved car truck may be made and substituted for those herein shown and described, without departing from the spirit of my invention, the scope of which is set forth in the appended claims.

I claim:

1. In car truck construction, a side frame, load carrying springs positioned thereupon, a bottom center plate positioned above said load carrying springs and adapted to serve as a support for a part of the car body, and auxiliary springs interposed between the bottom center plate and load carrying springs.

2. In car truck construction, a side frame, load carrying springs thereupon, a bottom center plate disposed above said load carrying springs and having sliding engagement with said side frame, and compensating springs interposed between said bottom center plate and the load carrying springs.

3. In car truck construction, a truck side frame, load carrying springs thereupon, a plate positioned on said load carrying springs, auxiliary springs supported by said plate, and a bottom center plate supported by said auxiliary springs.

4. In car truck construction, a truck side frame, load carrying springs thereupon, a plate positioned on said load carrying springs, auxiliary springs supported by said plate, and a bottom center plate supported by said auxiliary springs, and which bottom center plate has sliding engagement with the truck side frame.

5. In car truck construction, a truck side frame, load carrying springs thereupon, a plate positioned on said load carrying springs, auxiliary springs supported by said plate, a bottom center plate supported by said auxiliary springs, and a housing on said bottom center plate for said auxiliary springs.

6. In car truck construction, a truck side frame, load carrying springs thereupon, a plate positioned on said load carrying springs, auxiliary springs supported by said plate, a bottom center plate supported by said auxiliary springs, a housing on said bottom center plate for said auxiliary springs, and side frame engaging guides on said housing.

7. In car truck construction, a truck side frame, load carrying springs thereon, an inverted cup shaped housing supported by said load carrying springs, the upper portion of which housing constitutes a bottom center plate, and compensating springs within said housing.

8. In car truck construction, a truck side frame, load carrying springs thereon, an inverted cup shaped housing supported by said load carrying springs, the upper portion of which housing constitutes a bottom center plate, which housing is guided for vertical movement upon the truck side frame, and compensating springs within said housing.

9. In car truck construction, a truck side frame, load carrying springs thereupon, a bottom center plate disposed above said load carrying springs, auxiliary springs disposed between the load carrying springs and said bottom center plate, which auxiliary springs are normally under tension, and means for securing the bottom center plate to the truck side frame against the expansive action of said auxiliary springs.

10. The combination with a truck side frame, of a bottom center plate having sliding engagement with said side frame, springs interposed between the side frame and bottom center plate, and means for securing the bottom center plate to the side frame against the expansive action of said springs when the load carrying member that is supported by said bottom center plate is removed.

11. In car construction, a truck side frame having pivotal relation with the car underframe, load carrying springs supported by said side frame, a bottom center plate having sliding engagement with the truck side frame and supported by the load carrying springs, and a normally compressed auxiliary spring interposed between the load carrying springs and said bottom center plate.

12. In car construction, a truck side frame having pivotal relation with the car underframe, load carrying springs supported by said side frame, a bottom center plate having sliding engagement with the truck side frame and supported by the load carrying springs, a normally compressed auxiliary spring interposed between the load carrying springs and said bottom center plate, and means for securing said bottom center plate to the side frame against the expansive action of said auxiliary spring.

13. In car construction, a truck side frame having pivotal connection with a part of the car underframe, bottom center plate forming a part of the pivotal connection between the side frame and underframe, auxiliary springs beneath said bottom center plate, and springs supporting said bottom center plate and said auxiliary springs.

14. In car construction, a truck side frame having pivotal connection with a part of the car underframe, a bottom center plate forming a part of the pivotal connection between the side frame and underframe, auxiliary springs beneath said bottom center plate, springs supporting said bottom center plate and said auxiliary springs, and said bottom center plate having sliding engagement with said side frame.

15. In car construction, a truck side frame having pivotal connection with a part of the car underframe, a bottom center plate forming a part of the pivotal connection between the side frame and underframe, auxiliary springs beneath said bottom center plate, springs supporting said bottom center plate and said auxiliary springs, and means for securing said bottom center plate to the side frame against the expansive action of the springs.

In testimony whereof I hereunto affix my signature this 6th day of August, 1919.

HARRY M. PFLAGER.